United States Patent [19]

Muto et al.

[11] Patent Number: 5,558,031
[45] Date of Patent: Sep. 24, 1996

[54] APPARATUS FOR PROCESSING EMBROIDERY DATA SO AS TO ENLARGE LOCAL BLOCKS OF ADJACENT EMBROIDERY PATTERNS

[75] Inventors: Yukiyoshi Muto; Masao Futamura; Masahiro Mizuno, all of Nagoya, Japan

[73] Assignee: Brother Kogyo Kabushiki Kaisha, Nagoya, Japan

[21] Appl. No.: 452,496

[22] Filed: May 30, 1995

[30] Foreign Application Priority Data

Jun. 1, 1994 [JP] Japan .................................. 6-119943

[51] Int. Cl.$^6$ .............................. D05B 21/00; D05C 9/06
[52] U.S. Cl. .................................. 112/102.5; 112/470.04
[58] Field of Search .......................... 112/102.5, 470.04, 112/470.06, 456, 457, 475.19, 475.05; 364/470

[56] References Cited

U.S. PATENT DOCUMENTS 5,386,789  2/1995  Futamura et al. ................. 112/102.5
5,390,126  2/1995  Kongho et al. ................... 112/102.5 X
5,410,976  5/1995  Matsubara ........................ 112/102.5
5,438,520  8/1995  Satoh et al. ..................... 112/102.5 X

FOREIGN PATENT DOCUMENTS 4-288191  10/1992  Japan .
4-322695  11/1992  Japan .

Primary Examiner—Peter Nerbun
Attorney, Agent, or Firm—Oliff & Berridge

[57] ABSTRACT

An apparatus for processing embroidery data for forming an embroidery on a workpiece by a sewing machine, including an image reader for reading an original embroidery image to generate original embroidery image data, an outline generator for generating an outline of the original embroidery image from the original embroidery image data, a device for determining whether the outline should be changed so as to enlarge at least one area partially defined by the changed outline, a device for changing the outline according to the determination of the determining device, and a stitch data generator for generating stitch-position data representative of stitch positions defining the embroidery to be formed within the changed outline.

28 Claims, 9 Drawing Sheets

FIG. 7

| PATTERNS | PATTERN NUMBER M | STITCHING BLOCKS | BLOCK NUMBER B | BLOCK DEFINING POINTS | | | | ENLARGEMENT FLAGS | |
|---|---|---|---|---|---|---|---|---|---|
| | | | | 1ST | 2ND | 3RD | 4TH | FIRST FLAG | SECOND FLAG |
| T | 1 | T1 | 1 | P1 | P2 | P3 | P4 | OFF | OFF |
| | | T2 | 2 | P5 | P6 | P7 | P8 | OFF | OFF |
| | | T3 | 3 | P9 | P8 | P10 | P11 | ON | OFF |
| E | 2 | E1 | 1 | P12 | P13 | P14 | P15 | OFF | ON |
| | | E2 | 2 | P12 | P16 | P17 | P18 | OFF | OFF |
| | | E3 | 3 | P19 | P20 | P21 | P22 | OFF | OFF |
| | | E4 | 4 | P21 | P23 | P24 | P25 | OFF | ON |
| | | E5 | 5 | P24 | P26 | P27 | P28 | OFF | OFF |
| | | E6 | 6 | P29 | P14 | P30 | P31 | OFF | OFF |
| | | E7 | 7 | P32 | P33 | P34 | P35 | OFF | OFF |
| L | 3 | L1 | 1 | P36 | P37 | P38 | P39 | ON | ON |
| | | L2 | 2 | P40 | P38 | P41 | P42 | OFF | OFF |

APPARATUS FOR PROCESSING EMBROIDERY DATA SO AS TO ENLARGE LOCAL BLOCKS OF ADJACENT EMBROIDERY PATTERNS

BACKGROUND OF THE INVENTION

1. Field of the Invention

The present invention relates to an apparatus for processing embroidery data used by an embroidery sewing machine to form an embroidery on a workpiece. More particularly, this invention is concerned with an apparatus for modifying stitch-position data representative of stitch positions, so as to enlarge selected local blocks of adjacent embroidery image patterns to be formed on the workpiece, so as to prevent undesirables gaps between mutually bounding blocks of the adjacent embroidery image patterns.

2. Discussion of the Related Art

In the field of industrial sewing machines, there is known an embroidery data generating apparatus using a microcomputer, which is capable of efficiently generating embroidery data for effecting an embroidering operation to form a desired embroidery on a desired workpiece such as a work fabric. For instance, such an embroidery data generating apparatus utilizes an image scanner and a mouse that are connected to a general-purpose personal computer, and is adapted to generate embroidery data on the basis of an original embroidery image.

The original embroidery image may consist of a single image pattern, or a combination of two or more image patterns which are positioned relative to each other as desired. An image pattern may be a character, for instance. In an example shown in FIG. 3, an embroidery image consists of a combination of three alphabetic letters "T", "E" and "L" which are arranged such that the adjacent characters are partially superimposed on each other.

To generate embroidery data for the original embroidery image of FIG. 3, the original image is read by an image scanner, and the outlines of the constituent image patterns in the form of the alphabetic letters "T", "E" and "L" are determined as indicated in FIG. 5. Then, the outline of each letter is divided into component blocks according to a suitably formulated blocking algorithm, as indicated in FIG. 6 by way of example only. The embroidery data include stitch-position data representative of stitch positions P1–P42, more precisely, the positions P1–P42 at which the needle of an embroidery sewing machine penetrates the workpiece to form stitches. The embroidery data including the thus generated stitch-position data are stored in a memory, and used by the sewing machine to effect an embroidery sewing operation wherein the needle and the workpiece (supported by a suitable work holder) are moved relative to each other, according to the stitch-position data, in a predetermined stitching direction. The stitching direction is determined for each block of each image pattern (alphabetic letter), as indicated by arrows in FIG. 6.

However, adjacent embroidery image patterns formed according to the conventionally generated stitch-position data suffer from the occurrence of gaps between mutually bounding blocks of the adjacent image patterns, which blocks are embroidered with stitches formed in the same direction. For example, block T3 of letter "T" and block E1 of letter "E" which are bounded by each other are embroidered in the same direction (horizontal direction as seen in FIG. 6). Consequently, the stitches formed in the block T3 cause a tension acting on the workpiece so as to pull the side P9–P10 of the block T3 away from the side P13–P15 of the block E1. Similarly, the stitches formed in the block E1 cause a tension which pulls the side P13–P15 of the E1 away from the side P9–P10 of the block T3. As a result, an area of the workpiece along the adjacent sides P9–10 and P13–P15 of the blocks T3, E1 is exposed or is not covered by the stitches. Thus, the mutually bounding blocks which have been embroidered in the same direction tend to be more or less spaced apart from each other. Namely, gaps are created between the mutually bounding blocks.

The portions of the formed embroidery at which such gaps are created can be found by performing a test or trial embroidering operation on the workpiece. To avoid the occurrence of the gaps, the user or operator of the sewing machine should change or modify the originally generated stitch-position data representative of the outlines of the image patterns, so that the blocks that bound each other according to the original stitch-position data overlap each other by a suitable distance as measured from the original boundary. However, the procedure to change or modify the original stitch-position data is cumbersome and time-consuming, and may lead to an erroneous modification of the original stitch-position data.

SUMMARY OF THE INVENTION

It is therefore an object of the present invention to provide an apparatus for automatically processing embroidery data which do not cause the occurrence of gaps between mutually bounding local blocks of adjacent image patterns of an actually formed embroidery image.

The above object may be achieved according to one aspect of this invention, which provides an apparatus for processing embroidery data including stitch-position data representative of stitch positions defining an embroidery to be formed on a workpiece by a sewing machine, the apparatus comprising:

image reading means for reading an original embroidery image corresponding to the embroidery to be formed on the workpiece, and generating original embroidery image data representative of the original embroidery image; (a) outline generating means for generating outlines of the original embroidery image on the basis of the original embroidery image data; (b) determining means for determining whether at least one of the outlines should be changed so as to enlarge, in at least one direction, at least one area which is partially defined by the above-indicated at least one of the outlines; (c) outline changing means for changing the above-indicated at least one of the outlines, if the determining means determines that the above-indicated at least one of the outlines should be moved; and (d) stitch-position data generating means for generating stitch-position data representative of stitch positions defining the embroidery to be formed within the outlines which include the above-indicated at least one outline changed by the outline changing means.

In the embroidery data processing apparatus of the present invention constructed as described above, the embroidery image data representative of the original embroidery image are generated by reading the original embroidery image by the image reading means, and the outlines of the original embroidery image are generated on the basis of the original embroidery image data. The outlines are automatically analyzed by the determining means, which determines whether any one of the outlines should be changed so as to enlarge, in one direction or opposite directions, any area which is partially defined by the outline. Based on a result of this determination, the outline that should be changed is changed by the outline changing means, and the stitch-position data representative of stitch positions defining an embroidery to be formed within the outlines are generated.

Each outline of the original embroidery image that should be changed to avoid otherwise possible occurrence or presence of a gap between adjacent local areas of the actually formed embroidery image is automatically changed so as to enlarge the corresponding area of the image, and the stitch-position data actually used to form the embroidery on the workpiece are generated so that the stitches are formed within the enlarged area partially defined by the changed outline. Thus, the present apparatus permits improved efficiency and enhanced accuracy of generation of embroidery data suitable for forming a desired embroidery on the workpiece, without conventionally required cumbersome, time-consuming analysis and manipulation by the user of the apparatus.

In one preferred form of the apparatus described above, when the original embroidery image includes a plurality of image patterns having respective outlines, the determining means determines that an outline of one of the image patterns should be changed if the outline which should be changed is adjacent to the outline of another of the image patterns. In this case, the determining means may be adapted such that if the outline of each of the image patterns includes two major segments which are spaced apart from each other, the determining means determines whether at least one of the two segments should be moved in a direction substantially parallel to a stitching direction in which a needle of the sewing machine and the workpiece are reciprocated relative to each other according to the stitch-position data.

In another preferred form of the invention, the apparatus further comprises direction determining means for determining the stitching direction, namely, a direction of relative reciprocating movement of the needle of the sewing machine and the workpiece. In this case, the determining means determines whether the above-indicated at least one of the outlines of the original embroidery image should be changed in at least one direction parallel to the stitching direction.

A further preferred form of the invention is applicable where the original embroidery image includes a plurality of image patterns having respective outlines, and the outline of each of the image patterns includes two major segments which are spaced apart from each other in a direction substantially parallel to a stitching direction in which a needle of the sewing machine and the workpiece are reciprocated relative to each other according to the stitch-position data. In this form of the invention, the determining means includes proximity determining means for at least determining whether each of the two major segments of the outline of each one of the image pattern is adjacent to the outline of another of the image patterns, and the outline changing means includes segment moving means for changing at least one of the two major segments which is determined by the proximity determining means to be adjacent to the outline of the another image pattern, by moving the at least one of the two major segments into the outline of the another image patterns. In this case, the segment moving means of the outline changing means may be adapted to move both of the two major segments if the proximity determining means determines that one of the two major segments is adjacent to the outline of the above-indicated another image pattern, such that the above-indicated one of the two major segments is moved in one direction into the outline of the above-indicated another image pattern while the other of the two major segments is moved in a direction opposit to the above-indicated one direction.

The determining means may be adapted to determine that the outline of the one image pattern is adjacent to the outline of the above-indicated another image pattern if a distance between a segment of the outline of the above-indicated one image pattern and a segment of the outline of the above-indicated another image pattern is smaller than a predetermined first threshold, and if an amount of overlap of the above-indicated one image pattern and the above-indicated another image pattern is smaller than a predetermined second threshold. In this instance, the outline changing means may be adapted to move the segment of the outline of the above-indicated one image pattern into the outline of the above-indicated another image pattern, and moves the segment of the outline of the above-indicated another image pattern into the outline of the above-indicated one image pattern, if the determining means determines that the outline of the above-indicated one image pattern is adjacent to the outline of the above-indicated another image pattern.

In a still further preferred form of this invention, the apparatus further comprises display means for displaying the outlines of the plurality of image patterns generated by the outline generating means, and operator-controlled input means for permitting an operator of the apparatus to specify at least one of the plurality of image patterns which the operator desires to enlarge. In this case, the outline changing means moves the outline of each of the image patterns which are specified by the operator through the operator-controlled input means.

The object indicated above may also be achieved according to another aspect of the present invention, which provides an apparatus for processing embroidery data relating to a plurality of embroidery image patterns to be formed on a workpiece by a sewing machine, each of the embroidery image patterns having an outline consisting of a plurality of segments, the apparatus comprising: (i) a first embroidery data memory for storing original image pattern data representative of the plurality of embroidery image patterns; (ii) pattern data changing means for changing the original image pattern data into modified image pattern data which cause a movement of each of at least one segment of the outline of at least one of two adjacent ones of the plurality of embroidery image patterns, which at least one segment is adjacent to at least one segment of the other of the two adjacent embroidery image patterns, the movement occurring in a direction toward the other of the two adjacent embroidery image patterns; and (iii) a second embroidery data memory for storing the modified image pattern data.

In the embroidery data processing apparatus constructed according to the second aspect of the invention described above, the original image pattern data representative of a plurality of embroidery image patterns are stored in the first embroidery data memory, and are automatically changed into modified image pattern data by the pattern data changing means, so that the modified image pattern data cause a movement of a segment of the outline of at least one of two adjacent embroidery image patterns, which segment is at least partially adjacent to at least one segment of the other of the two adjacent embroidery image patterns. The two segments of the two adjacent embroidery image patterns are considered to be adjacent to each other if the spacing between these two segments is smaller than a predetermined value and if the amount of overlap of the two adjacent image patterns is not larger than a predetermined value. The movement of that segment of one of the two adjacent embroidery image patterns occurs in a direction toward the other of the two adjacent two embroidery image patterns. The modified image pattern data are stored in the second embroidery data memory, for use on the sewing machine for actually forming the corresponding embroidery on the workpiece or for displaying the corresponding embroidery image on a suitable display. The present apparatus provides substantially the same advantages as described above with respect to the apparatus according to the first aspect of the invention.

It is noted that the apparatus according to the present second aspect of the invention does not require generation of stitch-position data as provided in the apparatus according to the first aspect of the invention. However, the apparatus may be provided with means for generating the stitch-position data on the basis of the modified image pattern data. Alternatively, the stitch-position data may be generated by a separate apparatus, which may or may not be a part of a sewing machine.

In one preferred form of the apparatus according to the present second aspect of the invention, the pattern data changing means comprises: determining means for determining whether each of the segments of the outline of each one of the two adjacent embroidery image patterns is adjacent to the above-indicated at least one segment of the other of the two adjacent embroidery image patterns; and segment data changing means for changing original segment data of the original image pattern data into modified segment data representative of each segment of the outline of at least one of the two adjacent embroidery image patterns, if that segment is adjacent to the above-indicated at least one segment of the other embroidery image pattern, so that the segment is moved in the direction toward the other embroidery image pattern.

In one advantageous arrangement of the above preferred form of the invention, the pattern data changing means further comprises change command memory means for storing change command data indicative of the changing of the original segment data into the modified segment data, and the change command data are stored in the change command memory means, in relation to the original segment data for which an affirmative decision is obtained by the determining means, so that the segment data changing means change the original segment data into the modified segment data on the basis of the change command data stored in the change command data memory means.

In another preferred form of the second aspect of the invention, the apparatus further comprises means for storing in the first embroidery data memory the modified image pattern data obtained by the pattern data changing means, whereby the the first embroidery data memory serves also as the second embroidery data memory.

In a further preferred form of the second aspect of this invention, the apparatus further comprises: image reading means for reading the plurality of embroidery image patterns and generating the original image pattern data; and outline generating means for generating the outlines of the embroidery image patterns on the basis of the original image pattern data. In this instance, the outline generating means may comprise: a display for displaying the plurality of embroidery image patterns represented by the original image pattern data; and an operator-controlled data input device for specifying the outlines of the embroidery image patterns, on the basis of the embroidery image patterns displayed on the display. The apparatus may further comprise blocking means for dividing each of the embroidery image patterns into a plurality of rectangular blocks, on the basis of the outlines generated by the outline generating means.

In a still further preferred form of the second aspect of the invention, the apparatus further comprises embroidery data generating means for generating the embroidery data for forming stitches within the outline of the plurality of embroidery image patterns, on the basis of the modified image pattern data stored in the second embroidery data memory. According one advantageous arrangement of this form of the invention, the embroidery data generating means includes stitch-position data generating means for generating the stitch-position data which represent positions at which a needle of the sewing machine penetrates the workpiece to form stitches for defining the plurality of embroidery image patterns. According to another advantageous arrangement, the apparatus further comprises application means for utilizing the embroidery data. In this case, the application means may comprise means for storing the embroidery data in a data storage medium removably installed on the apparatus. The application means may comprise stitch forming means for forming stitches on the workpiece, according to the embroidery data.

In a yet further preferred form of the second aspect of the invention, the pattern data changing means changes the original image pattern data into the modified image pattern data so that the mutually adjacent segments of the mutually adjacent outlines of the two adjacent embroidery image patterns are both moved such that one of the two adjacent segments which partially defines one of the two adjacent embroidery image patterns is moved into the other of the two adjacent embroidery image patterns while the other of the adjacent segments which partially defines the other of the two adjacent embroidery image patterns is moved into the above-indicated one of the two adjacent embroidery image patterns.

Each of the embroidery image patterns may consist of at least one quadrilateral block each of which has two major sides and two secondary sides connecting the major sides, each block being embroidered by stitching in a direction substantially parallel to a direction in which the two major sides are opposed to each other. The original image pattern data for each of the embroidery image patterns comprises at least one set of original block data each representative of the each block. In a still further preferred form of the second aspect of the invention, the pattern data changing means comprises block data changing means for changing at least one of the original block data sets representative of two blocks of respective two adjacent ones of the plurality of embroidery image patterns, if at least one of the two major sides of one of the two blocks at least partially is adjacent to at least by at least one of the two major sides of the other of the two blocks, so that the above-indicated at least one of the original block data sets changed by the block data changing means causes a movement of at least a portion of the above-indicated at least one of the two major sides of the above-indicated one of the two blocks toward the other of the two blocks, which portion is adjacent to the above-indicated at least one of the two major sides of the other of the two blocks.

In one advantageous arrangement of the above preferred form of the invention, the apparatus further comprises means for dividing a block of one of the two adjacent embroidery image patterns into two quadrilateral sub-blocks, if a first major side of the two major sides of the block to be divided into the two sub-blocks only partially is adjacent to a second major side of the two major sides of a block of the other of the two adjacent embroidery image patterns. In this case, one of the two sub-blocks has a major side which consists of a portion of the first major side which is adjacent to the second major side, while the other of the two sub-blocks has a major side which consists of the other portion of the first major side which is not adjacent to the second major side.

In another advantageous arrangement of the same form of the invention, the block data changing means is adapted to change the above-indicated at least one of the original block data sets so that a distance of movement of the portion of each of the above-indicated at least one of the two major sides of the above-indicated one of the two blocks toward the other of the two blocks is constant.

In a further advantageous arrangement of the same form of the invention, the block data changing means is adapted to change the above-indicated at least one of the original block data sets so that a distance of movement of the portion of each of the above-indicated at least one of the two major sides of the above-indicated one of the two blocks toward the other of the two block changes as a function of a distance between the two major sides.

BRIEF DESCRIPTION OF THE DRAWINGS

The above and other objects, features, advantages and technical significance of the present invention will be better understood by reading the following detailed description of a presently preferred embodiment of the invention, when considered in connection with the accompanying drawings, in which:

FIG. 7 is a view for explaining block data for the blocks of FIG. 6, and BLOCK ENLARGEMENT flags set for the individual blocks;

DETAILED DESCRIPTION OF THE PREFERRED EMBODIMENT

Figure 1:
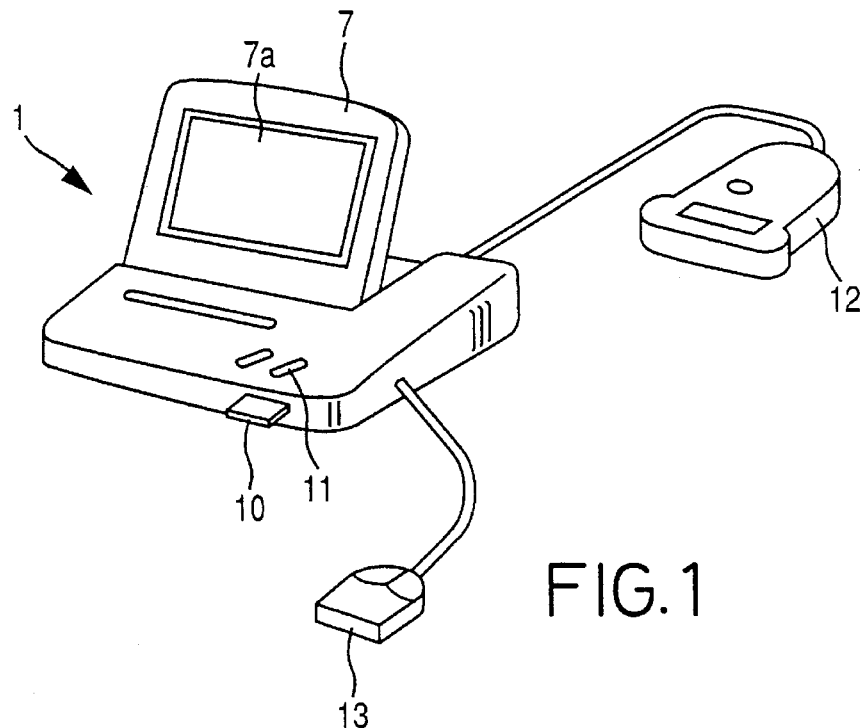
FIG. 1 is a perspective view of an embroidery data processing apparatus constructed according to one embodiment of the present invention.
Figure 2:
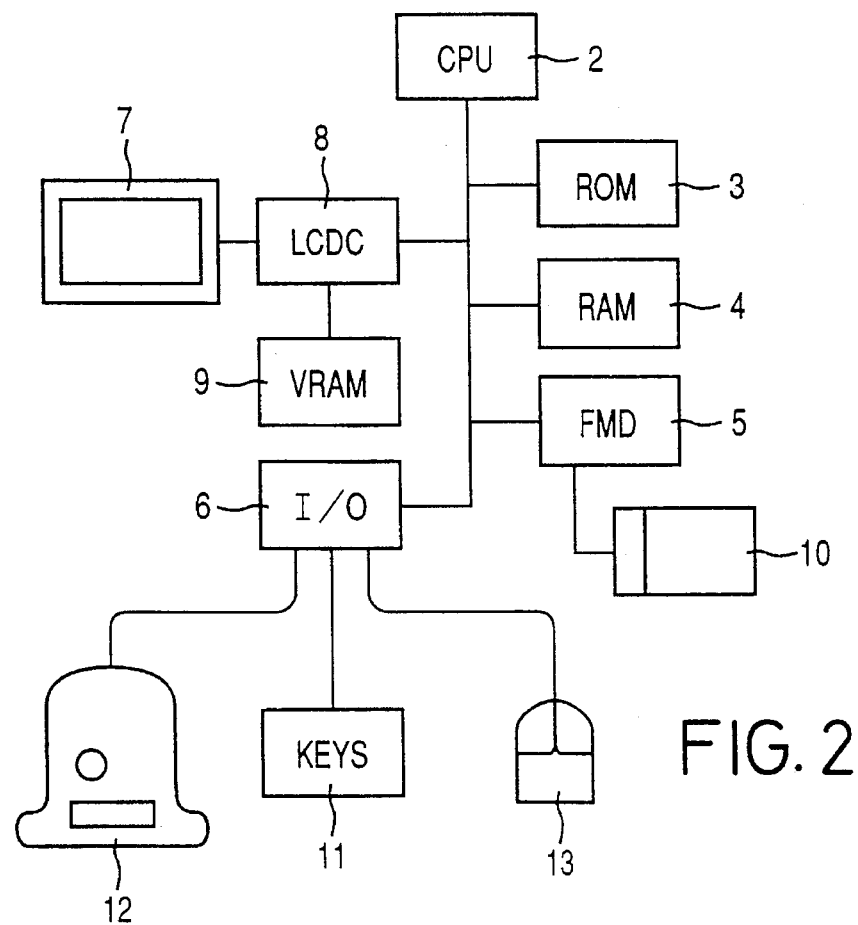
FIG. 2 is a block diagram illustrating a control system of the apparatus of FIG. 1.

Referring first to FIGS. 1 and 2, an embroidery data processing apparatus generally indicated at 1 in FIG. 1 incorporates a microcomputer as a major portion of a control system as illustrated in FIG. 2. The microcomputer includes a central processing unit (CPU) 2, a read-only memory (ROM) 3, a random-access memory (RAM) 4, a flash memory device (FMD) 5, and an input and output interface (I/O) 6. These elements 2–6 are interconnected to each other via a data bus. The ROM 3 stores various programs such as programs for executing a routine as illustrated in the flow chart of FIG. 4, for generating stitch-position data, which are part of embroidery data usable by an embroidering sewing machine for forming a desired embroidery image on a workpiece such as a work fabric.

The embroidery data processing apparatus 1 has a display in the form of a liquid crystal display (LCD) 7, which constitutes an upper rear portion of the main body of the apparatus. The housing of the LCD 7 is pivotable between a rest position and an operating position of FIG. 1. The LCD 7 is provided to display various information and messages, such as embroidery data stored in an embroidery data memory in the form of a flash-memory card 10 installed in the apparatus. The flash-memory card 10 is removably set in the flash memory device 5. The LCD 7 is controlled by a liquid crystal display controller (LCDC) 8, which is connected to a display data memory in the form of a video RAM (VRAM) 9. The LCDC 8 is connected to the bus of the microcomputer.

Figure 3:
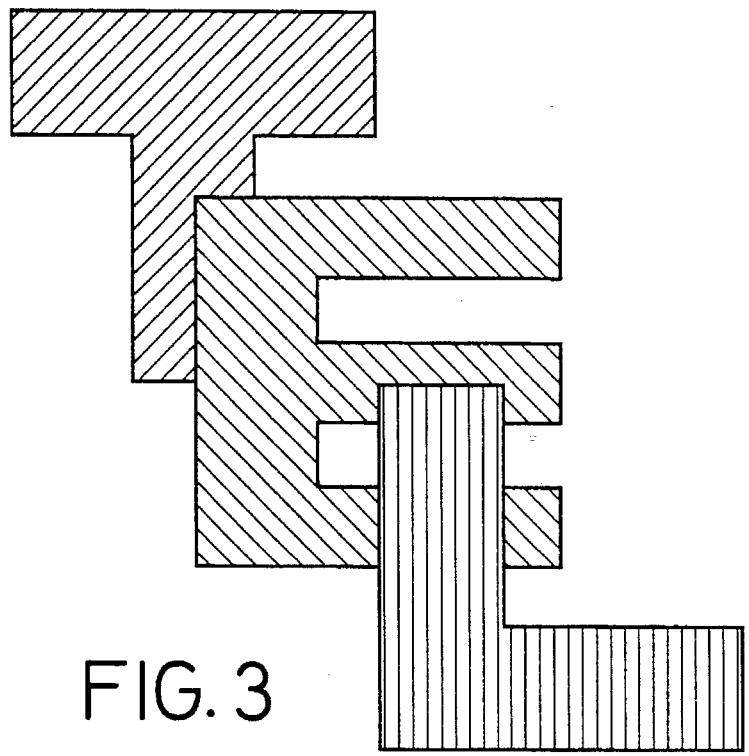
FIG. 3 is a view showing one example of an embroidery image whose embroidery data are processed according to the present invention.

To the I/O interface 6, there are connected some keys 11 operated by the user for operating and controlling the apparatus 1, an image scanner 12 for reading an original embroidery image, and a mouse 13 operated by the user for commanding the microcomputer for generating original embroidery image data. An example of the original embroidery image to be read by the image scanner 12 is shown in FIG. 3.

The image scanner 12 serves as image reading means which is capable of detecting the brightness of an image in multiple steps (e.g., 256 steps), and generating original embroidery image data representative of the original embroidery image. Described in detail, the original embroidery image data consist of brightness data indicative of local brightness values of the image corresponding to the individual picture elements of the image reading matrix of the image scanner 12. Accordingly, the image scanner 12 is capable of recognizing various original image patterns having different colors and accordingly different brightness values, even if these image patterns are partially superimposed on each other. The original embroidery image may consist of a plurality of image patterns, namely, a combination of image patterns as illustrated in FIG. 3 by way of example. The original embroidery image data obtained by the image scanner 12 are stored in the RAM 4, and are used to obtain the embroidery data necessary to form an embroidery image corresponding to the original image, as described below in detail. The obtained embroidery data are stored in the flash-memory card 10.

Figure 6:
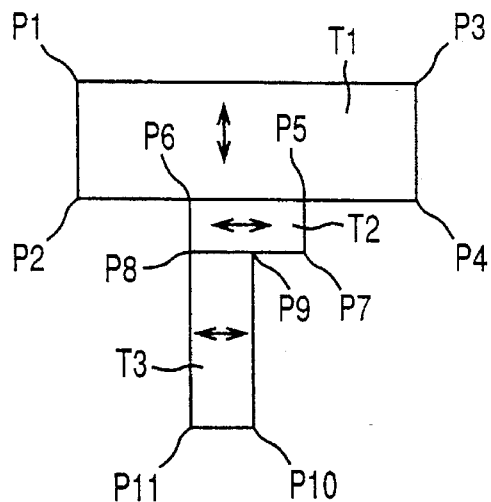
FIG. 6 is a view indicating component blocks of each image pattern of FIG. 5.
Figure 6:
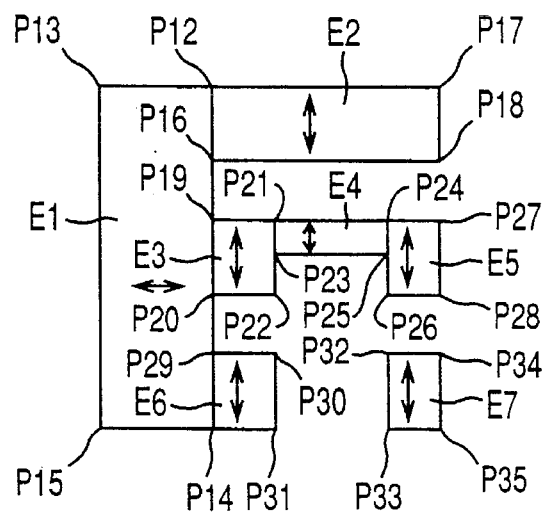
Figure 6:
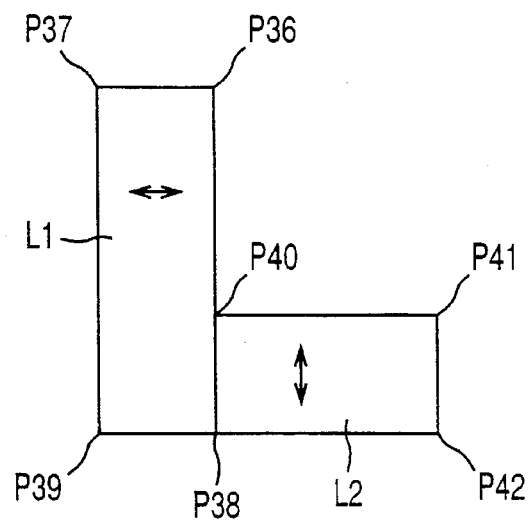

On the basis of the original embroidery image data obtained by the image scanner 12 and stored in the RAM 4, the original embroidery image is displayed on the LCD 7, and the outline of each image pattern of the original embroidery image is determined or specified by the operator using the mouse 13, so that the microcomputer generates outline data representative of the outline or outlines of the original image (consisting of a single image pattern or two or more image patterns). Then, each image pattern whose outline has been determined is divided into a plurality of quadrilateral blocks, usually, rectangular blocks, as indicated in FIG. 6 and as described below in detail. However, some original embroidery images may include an image pattern consisting of a single block. The embroidery data include stitch-position data representative of positions (X and Y coordinate values) of stitches to be formed within each block of each image pattern of the original embroidery image. Explained more particularly, the stitch-position data represent the stitch positions at which the needle penetrates the workpiece held by a suitable work holder on the sewing machine. In other words, the stitch-position data are used to move the needle and the workpiece relative to each other so as to form stitches at the selected local points within the outline of the individual blocks of each image pattern.

The individual blocks of the original embroidery image are represented by respective sets of block data. Each set of block data includes coordinate values of four apex points of the quadrilateral blocks. These four points are designated as a first point, a second point, a fourth point and a third point, which are arranged in the counterclockwise direction from the first point. Please refer to first, second, fourth and third points P1, P2, P4 and P3 of a first block T1 of an image pattern in the form of letter "T" shown in FIG. 6 by way of example. Each block defined by these four apex points has two major sides which are opposed to each other in a direction substantially parallel to the stitching direction indicated by arrows in FIG. 6. In this example of FIG. 6, each block consists of two or more rectangular blocks each of which has two parallel major sides and two parallel secondary sides which connect the two major sides. For example, the first block T1 of the letter "T" has a first major side P1–P3 and a second major side P2–P4, and a first secondary side P1–P2 and a second secondary side P3–P4. The stitching direction is defined as a direction in which the needle of the sewing machine and the workpiece are reciprocated relative to each other for forming stitches in a zigzag manner between the two major sides of the block, such that the positions of the stitches to be formed are moved in a predetermined embroidering direction, for example, in the direction from the first point toward the third point of the block, for example, from point P1 toward point P3 in the case of the first block T1 of letter "T" of FIG. 6.

The stitch-position data of the embroidery data are generated on the basis of image pattern data in the form of the block data indicated above. In the present embodiment, the stitch-position data are generated after the block data are changed or modified so as to enlarge the selected blocks as needed, as explained below in detail. The stitch-position data include data for moving the needle from the end of the last embroidered block to the beginning of the block to be embroidered next. The embroidery data include thread density data indicative of a so-called "thread density" of each block, namely, the number of threads per unit embroidering length. For example, stitches are formed in each block such that four stitching threads exist per 1 mm length in the embroidering direction parallel to the major sides of the blocks (and substantially perpendicular to the stitching direction indicated by arrows in FIG. 6).

As discussed below, the present embodiment is adapted to check if each major side of each block of each image pattern should be moved so as to enlarge that block, or not. Taking a third block T3 of letter "T" shown in FIG. 6, for example, the first major side P9–P10 is moved by a predetermined distance in the direction from the second point P8 toward the first point P9 (from the fourth point P11 toward the third points P10). Please refer to the above definitions of the first, second, third and fourth points and the first and second major sides of a block. While the distance of movement of the major sides is fixed, the distance of movement may be changed as a function of the distance or spacing between the first and second major sides of the block in question, that is, as a function of the length of the secondary sides of the block.

There will next be described a method of generating embroidery data on the basis of an original embroidery image, by reference to the flow chart of FIG. 4, which illustrates a routine for generating embroidery data for an original embroidery image consisting of a combination of image patterns in the form of letters "T", "E" and "L" as shown in FIG. 3. The routine of FIG. 3 includes step S4 of enlarging selected blocks of the letters "T", "E" and "L", so as to avoid the otherwise possible occurrence of gaps between the adjacent letters, as explained in the introductory part of the present specification. In a sewing operation according to the embroidery data generated as described below, letters "T", "E" and "L" are formed by respective threads of different colors.

Figure 4:
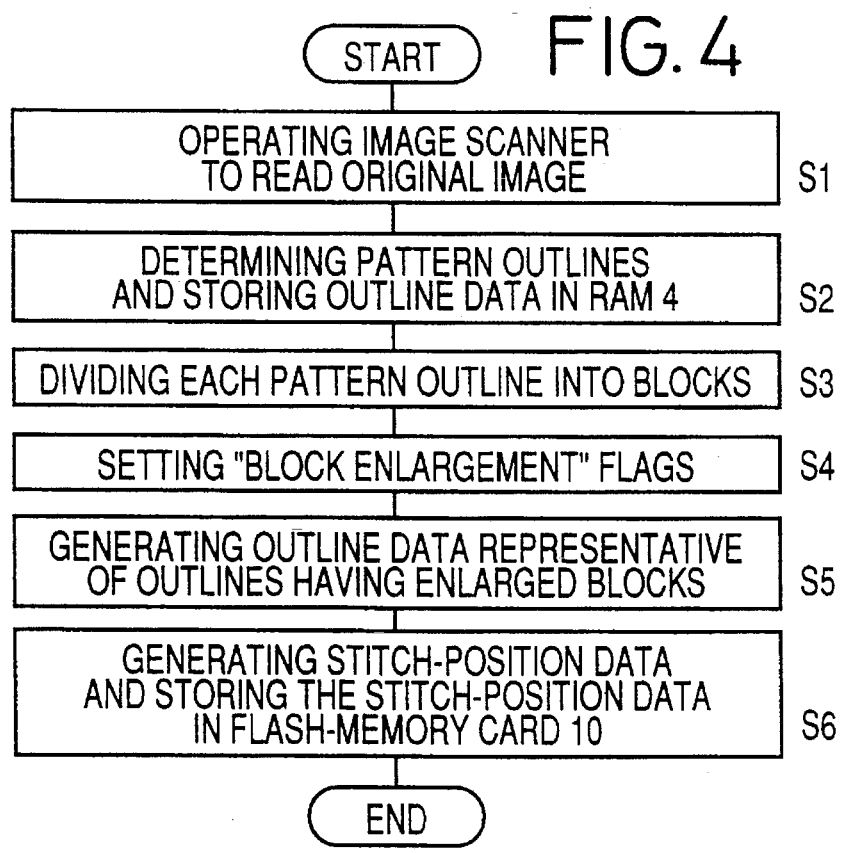
FIG. 4 is a flow chart illustrating an operation of the apparatus of FIG. 1 to generate and process embroidery data.

The routine of FIG. 4 is initiated with step S1 in which the original embroidery image consisting of mutually partially superimposed letters "T", "E" and "L" which have different colors and accordingly different brightness values is read by the image scanner 12 operated by the user, as described in co-pending application, Ser. No. 08/391,170 filed Feb. 21, 1995, the disclosure of which is herein incorporated by reference. In FIG. 6, each of the three areas indicated by different hatchings has the same brightness value. The original embroidery image data obtained by the image scanner 12 are stored in the RAM 4.

Figure 5:
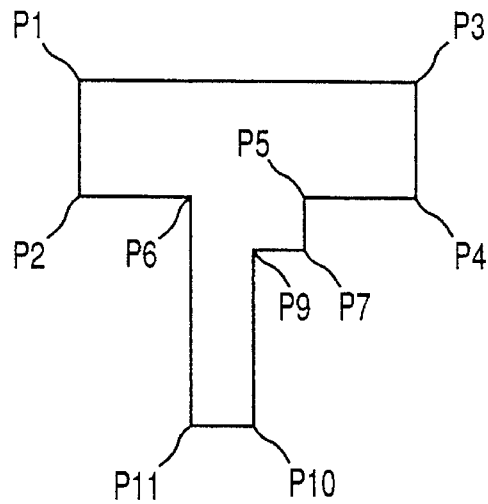
FIG. 5 is a view indicating constituent image patterns of the embroidery image of FIG. 3.
Figure 5:
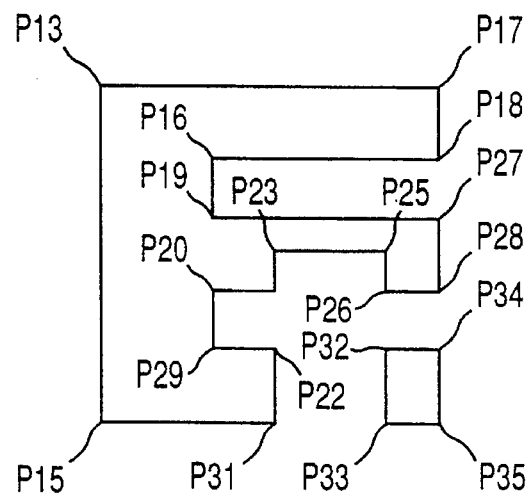
Figure 5:
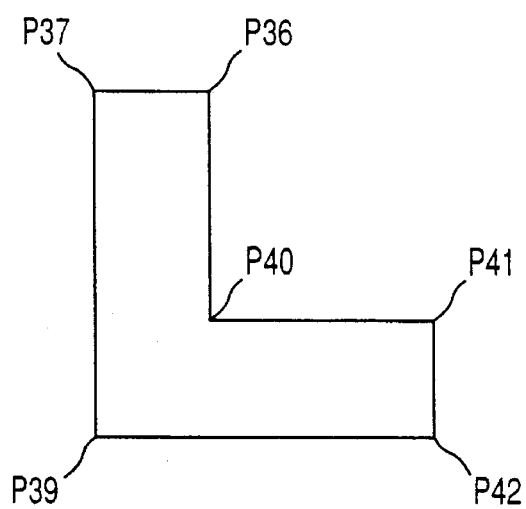

Step S1 is followed by step S2 in which the original embroidery image is displayed on the screen 7a of the LCD 7 on the basis of the original embroidery image data stored in the RAM 4. In this condition, the user or operator of the apparatus 1 specifies or enters the points which define the outline of each constituent image pattern, that is, each letter "T", "E", "L". This operation by the user is implemented by operating the mouse 13. The mouse 13 is operated to specify points P1–P11 defining the outline of the letter "T", points P13–P35 defining the outline of the letter "E", and points P36–P42 defining the letter "L", as indicated in FIG. 5. The outline data thus obtained are stored in the RAM 4.

It is noted that the outlines of the letters "T" and "E" defined by the outline defining points P1–P35 are not completely the same as the actual outlines of the normal alphabetic letters "T" and "E", due to partial placement of the letter "E" on the letter "T" and partial placement of the letter "L" on the letter "E". However, the outlines defined by the outline defining points as indicated in FIGS. 5 and 6 are treated as the outlines of the letters.

It is also noted that when the operator specifies the points defining the outlines of the individual image patterns while the original embroidery image is displayed on the display screen 7a, the operator may fail to correctly or accurately specify the outline defining points. For instance, although the point P13 of the letter "E" should have the same X and Y coordinates as those of the point P9 of the letter "T", the point P13 as specified by an operation of the mouse 13 may be different from the point P9 as designated by a previous operation of the mouse 13. Similarly, the X-coordinate of the point P15 of the letter "E" should be the same as that of the point P13, but the X-coordinates of the points P15 and P13 as specified by operations of the mouse 13 may be different from each other. Thus, some of the segments of the outlines of the adjacent image patterns as designated by the operator may differ from those of the original image pattern. For instance, the segment P9–P10 and the segment P13–P15 which should partially lie on each other may be spaced apart from each other according to the outlines of the original image as specified by the operator. However, such erroneous or inaccurate manual definition of the outlines of the image patterns by the operator does not cause a problem (such as a gap left between the letters "T" and "E" which are actually formed by stitching), since the outlines as defined by the operator are processed in steps S3–S5 according to the principle of the present invention, as discussed below in detail.

Then, the control flow goes to step S3 in which each letter whose outline is defined by the outline data stored in the RAM 4 is divided into a plurality of rectangular blocks according to a known method. As shown in FIG. 6, each block is defined by the first, second, third and fourth points. For example, the first block T1 of the letter "T" is defined by the first through fourth points P1–P4. Thus, a batch of block data corresponding to the outline data is generated. Step S3 is followed by step S4 indicated above for setting a first and a second BLOCK ENLARGEMENT flag for each of the two major sides of each block. These BLOCK ENLARGEMENT flags provided in the RAM 4 indicate whether each major side of each block should be moved in such a direction as to enlarge the relevant block, the direction being substantially parallel to the stitching direction, which is parallel to the secondary sides of the blocks. The setting of the BLOCK ENLARGEMENT flags to determine whether each of the major sides of each block of each image pattern or letter should be moved is implemented depending upon whether each major side of the block in question overlaps or lies on any one of the four sides of any block of the other letters. In other words, the BLOCK ENLARGEMENT flags indicate whether each block of each letter is bounded, at its major side or sides, by any block of the other letters. When the BLOCK ENLARGEMENT flat is set to "ON" for a given major side of a given block, the major side is moved so as to enlarge that block.

The BLOCK ENLARGEMENT flags may be set in step S4, either manually by the user using the mouse 13 while the letters each divided into the blocks are displayed on the LCD 7, or automatically according to a sub-routine which will be described in detail by reference to the flow chart of FIG. 9. Thus, the BLOCK ENLARGEMENT flags for the two major sides of all blocks of all image patterns (letters "T", "E" and "L") are set as indicated in FIG. 7.

Figure 8:
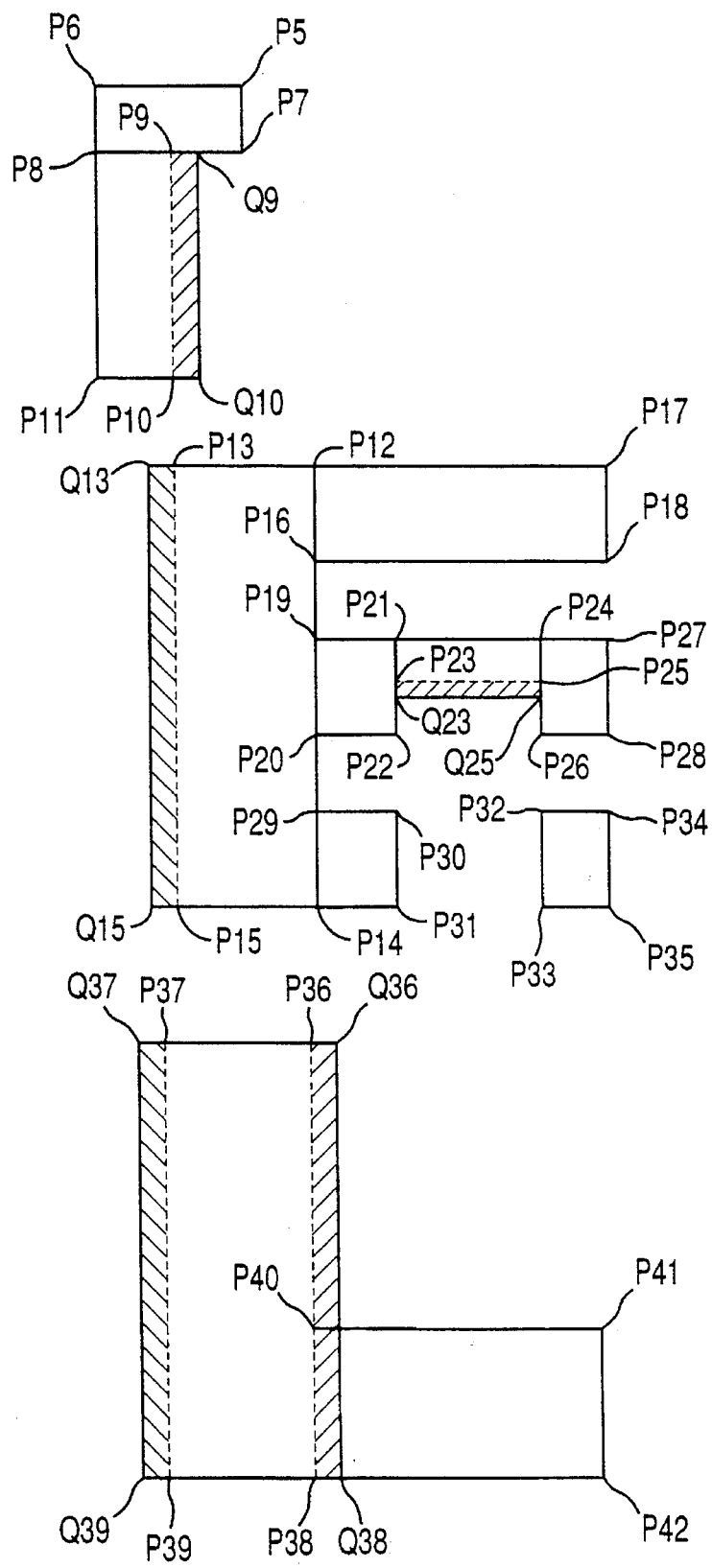
FIG. 8 is a view showing some of the blocks of FIG. 6 which are enlarged according to the BLOCK ENLARGEMENT flags.

Then, the control flow goes to step S5 to modify the batch of block data generated in step S3 and stored in the RAM 4, more specifically, modify appropriate sets of block data according to the BLOCK ENLARGEMENT flags stored in the RAM 4, so that the appropriate major sides of the blocks are moved or shifted in the appropriate direction so as to enlarge the blocks, as indicated by hatched areas in FIG. 8, for avoiding gaps which would occur between the adjacent letters "T", "E", "L" as formed by embroidering on the workpiece if the embroidering operation were effected according to the embroidery data generated from the original block data corresponding to the original outline data of the original embroidery image. The cause for the occurrence of such gaps is explained in the introductory part of the present specification. Step S5 is followed by step S6 in which the stitch-position data of the embroidery data are generated on the basis of the modified block data, namely, modified image pattern data. The thus generated stitch-position data are stored in the flash-memory card 10. The flash-memory card 10 is removed from the apparatus 1, and is used with a desired embroidering sewing machine, for performing an embroidering operation to form an embroidery on the workpiece, or for just checking or confirming the embroidery data stored therein while the embroidery image is displayed on a suitable display.

Figure 9:
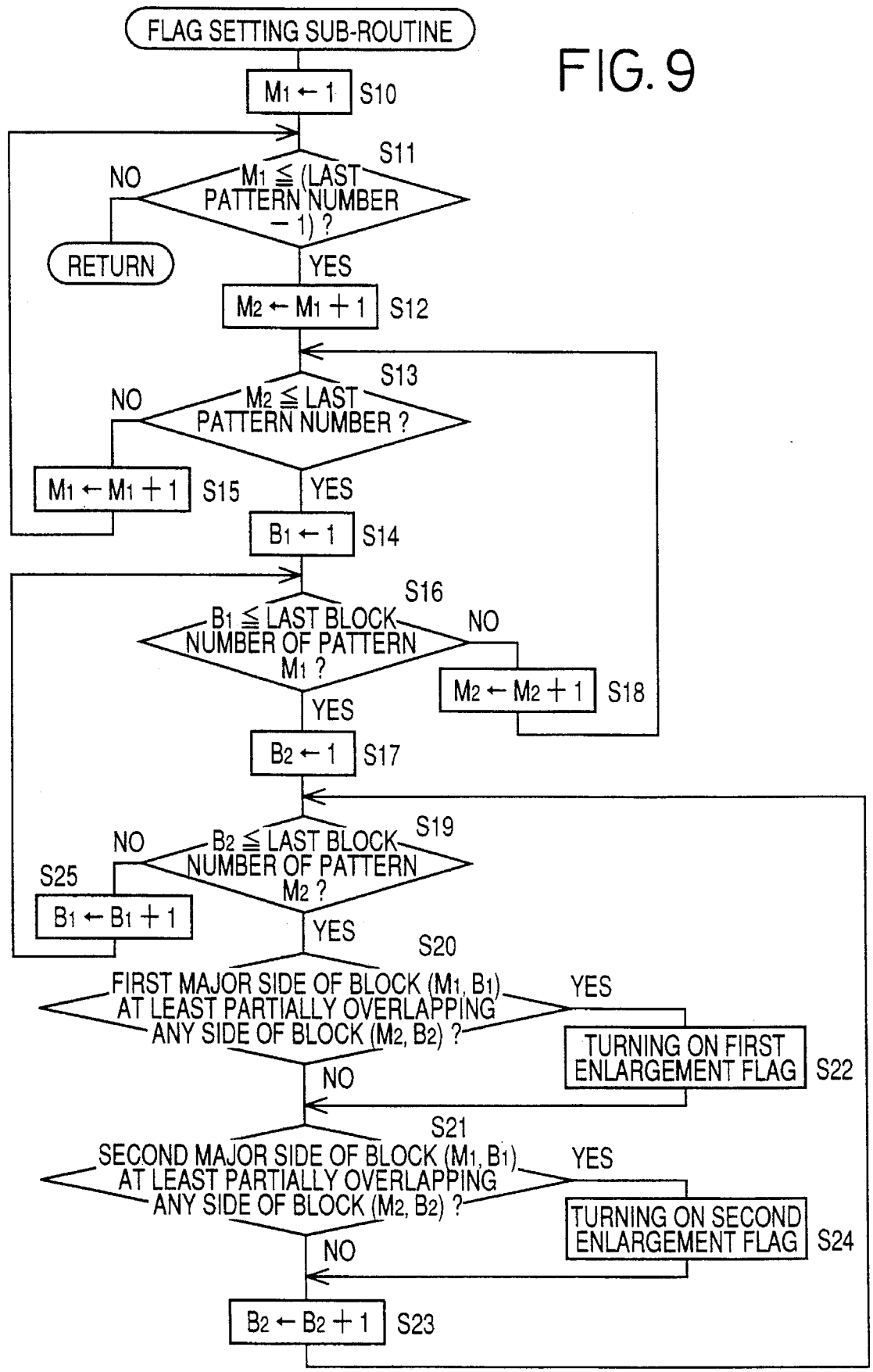
FIG. 9 is a flow chart illustrating a flag setting routine executed by the control system to automatically set the BLOCK ENLARGEMENT flags.

The step S4 of setting the BLOCK ENLARGEMENT flags in the automatic mode is illustrated in detail in the flow chart of FIG. 9. It is noted that the sub-routine of FIG. 9 is executed twice, firstly with the letters "T", "E" and "L" being respectively numbered "1,", "2" and "3" and secondly with these letters "T", "E" and "L" being respectively numbers "3", "2" and "1". As is apparent from the following description, one execution of the sub-routine is terminated when a negative decision (NO) is obtained in step S11.

The sub-routine of FIG. 9 is formulated to determine whether any of the two major sides of any block of one constituent image pattern (e.g., letter pattern "T") of the original embroidery image at least partially overlaps or lies on any side of any block of another constituent image pattern (e.g., letter pattern "E") of the original embroidery image. These two image patterns to be considered are indicated as M1 and M2 in the flow chart of FIG. 9, and will be referred to as "first object pattern" and "second object pattern", respectively. The first and second object patterns M1 and M2 are initially set in respective steps S10 and S12, and then sequentially and incrementally changed in respective steps S15 and S18. Further, a block of the first object pattern M1 and a block of the second object pattern M2 are indicated as B1 and B2 and will be referred to as "first object block" and "second object block", respectively. These first and second object blocks B1 and B2 are initially set in respective steps S14 and S17, and then sequentially and incrementally changed in respective steps S25 and S23.

The sub-routine of FIG. 9 is initiated with step S10 to initially set the pattern #1 as the first object pattern M1. In the example of the original embroidery image "TEL" of FIGS. 3 and 6, the letter "T" is the pattern #1 in the first cycle of execution of the sub-routine of FIG. 9. Step S10 is followed by step S11 to determine whether the pattern number of the first object pattern M1 is smaller than or equal to the last pattern number minus "1". In the example of the original embroidery image "TEL", the last pattern number is equal to "3", and step S11 is to determine whether the pattern number of the first object pattern M1 is smaller than or equal to (3−1)=2. If a negative decision (NO) is obtained in step S11, that is, if the pattern number of the currently set first object pattern M1 is "3" or larger, the first cycle of execution of the sub-routine of FIG. 9 is terminated, and the sub-routine is executed again with the pattern numbers of the image patterns (letters "T", "E" and "L") being reversed as indicated above.

When an affirmative decision (YES) is obtained in step S11, the control flow goes to step S12 to set the second object pattern M2 by adding "1" to the pattern number of the first object pattern M1. If the pattern #1 is set as the first object pattern M1, the pattern #2 is set as the second object pattern M2. Step S12 is followed by step S13 to determine whether the pattern number of the second object pattern M2 is smaller than or equal to the last pattern number (pattern #3 in the example of FIGS. 3 and 6). That is, the pattern number of the second object pattern M2 is incremented until it is equal to "3" in the example of FIGS. 3 and 6. If a negative decision (NO) is obtained in step S13, the control flow goes to step S15 to increment the pattern number of the first object pattern M1, and then returns to step S11. If an affirmative decision (YES) is obtained in step S13, the control flow goes to step S14 to initially set the block #1 as the first object block B1. In the example of FIGS. 3 and 6, the block #1 is the first block T1 if the first object pattern M1 is the letter "T".

Step S14 is followed by step S16 to determine whether the block number of the first object block B1 is smaller than or equal to the last block number (block #3, i.e., third block T3 in the example of FIGS. 3 and 6, when the letter "T" is the first object pattern M1). If a negative decision (NO) is obtained in step S16, the control flow goes to step S18 to increment the pattern number of the second object pattern M2, and goes back to step S13. If an affirmative decision (YES) is obtained in step S16, the control flow goes to step S17 to initially set the block #1 as the second object block B2. Step S17 is followed by step S19 to determine whether the block number of the second object block B2 is smaller than or equal to the last block number of the second object pattern M2. If the letter "E" is selected as the second object pattern M2, for example, the last block number is "7" and a negative decision (NO) is obtained in step S19 when the block number of the second object pattern M2 is equal to "8". If the negative decision (NO) is obtained in step S19, step S25 is implemented to increment the block number of the first object block B1, and the control flow goes to step S16.

If an affirmative decision (YES) is obtained in step S19, the control flow goes to steps S20, S21, S22 and S24 to set the BLOCK ENLARGEMENT flags for the first and second major sides of the currently set first object block B1 of the currently set first object pattern M1, depending upon whether each of the first and second major sides of the currently set first object block B1 at least partially overlaps or lies on any one of the four sides of the currently set second object block B2 of the currently set second object pattern M2, as described below in detail. Steps S20, S21, S22, S24 are followed by step S23 to increment the block number of the second object block B2. After step S23 is implemented, the control flow goes back to step S19 to repeatedly implement steps S20–24 until the block number of the second object block B2 has exceeded the last block number of the currently set second object block B2. If the currently set second object block B2 is the letter "E", steps S20–S24 are repeatedly implemented until the block number of the second object block B2 has been incremented to "8".

Step S20 is formulated to determine whether the first major side of the currently set first object block B1 of the currently set first object pattern M1 at least partially overlaps or lies on any side of the currently set second object block B2 of the currently set second object pattern M2. These first and second object blocks B1, B2 will be referred to as "(B1, M1)" and "(B2, M2)", respectively, where appropriate. The first major side is the major side which connects the first and third points of the first object block (B1, M1), while the second major side is the major side which connects the second and fourth points of the block, as described above. Please also refer to FIG. 7 which indicates the points defining the individual blocks of the letters "T" , "E" and "L". If an affirmative decision (YES) is obtained in step S20, the control flow goes to step S22 to set the first BLOCK ENLARGEMENT flag to "ON" so as to move the first major side of the first object block (B1, M1) toward the second object block (B2, M2). Step S22 is followed by step S21. This step S21 is implemented also if a negative decision (NO) is obtained in step S20. Namely, step S22 to set the first BLOCK ENLARGEMENT flag to "ON" is skipped if the negative decision (NO) is obtained in step S20.

Step S21 is formulated to determine whether the second major side of the currently set first object block (B1, M1) at least partially overlaps or lies on any side of the currently set second object block (B2, M2). If an affirmative decision (YES) is obtained in step S21, the control flow goes to step S24 to set the second BLOCK ENLARGEMENT flag to "ON" so as to move the second major side of the first object block (B1, M1) toward the second object block (B2, M2). Step S24 is followed by step S23. This step S23 is implemented also if a negative decision (NO) is obtained in step S21. Namely, step S24 to set the second BLOCK ENLARGEMENT flag to "ON" is skipped if the negative decision (NO) is obtained in step S21.

In the example of FIGS. 3 and 6, steps S19–S24 are repeatedly implemented during the first cycle of execution of the sub-routine of FIG. 9, to set the first and second BLOCK ENLARGEMENT flags, firstly for each of the major sides of each of the three blocks T1–T3 of the letter "T" with respect to each of the seven blocks E1–E7 of the letter "E" and each of the two blocks L1 and L2 of the letter "E", and secondly for each of the major sides of each of the seven blocks E1–T7 of the letter "E" with respect to each of the two blocks L1 and L2 of the letter "L".

When the negative decision (NO) is obtained in step S11, the first cycle of execution of the sub-routine is terminated, and the second cycle of execution is initiated. In this second execution, the letters "T" , "E" and "L" are reversely numbered, namely, numbered "3", "2" and "1", respectively As a result, steps S19–S24 are repeatedly implemented during the second cycle of execution to set the first and second BLOCK ENLARGEMENT flags, firstly for each of the major sides of each of the two blocks L1 and L2 of the letter "E" with respect to each of the seven blocks E1–E7 of the letter "E" and each of the three blocks T1–T3 of the letter "T", and secondly for each of the major sides of each of the seven blocks E1–E7 of the letter "E" with respect to each of the three blocks T1–T3 of the letter "T".

As a result of the first and second cycles of execution of the sub-routine of FIG. 9, the first and second BLOCK ENLARGEMENT flags are set for each of the first and second major sides of all the blocks T1–T3, E1–E7 and L1–L2 of the letters "T" , "E" and "L" as indicated in the table of FIG. 7, in the example of the original embroidery image of FIGS. 3 and 6. In the present example, the first BLOCK ENLARGEMENT flag for the first major side P9–P10 of the third block T3 of the letter "T" is set to "ON" because the first major side P9–P10 partially overlaps or lies on the second major side P13–P15 of the first block E1 of the letter "E". In other words, the third block T3 of the letter "T" is bounded, at its first major side P9–P10, by the first block E1 of the letter "E".

It will be understood from the foregoing explanation that the present embroidery data processing apparatus 1 is capable of changing the outline or outlines of the original embroidery image or modifying the original outline data or image pattern data in the form of block data, so as to enlarge the image area or areas as defined by the original outline or outlines. More specifically, the apparatus 1 is adapted to move the appropriate major sides of the mutually bounding blocks of adjacent image patterns, so as to enlarge the relevant blocks for the purpose of avoiding the occurrence of gaps which would be present between the adjacent blocks of the adjacent image patterns which are actually formed by embroidery stitching if the stitching operation were effected according to the embroidery data obtained from the original embroidery image data or original block data or image outline data without the modification according to the principle of the present invention.

Since the setting of the first and second BLOCK ENLARGEMENT flags to move the selected major sides of the selected blocks of image patterns to enlarge the selected blocks is automatically effected by the microcomputer of the apparatus 1, the embroidery data including stitch-position data for a desired embroidery image can be efficiently and accurately generated without a need for cumbersome, time-consuming analysis and manipulation by the user. Further, the stitch-position data generated by modification of the original block data depending upon the appropriately set states of the BLOCK ENLARGEMENT flags assure comparatively faithful reproduction of the desired original embroidery image, since the enlargement of the blocks is effected for only those portions of the original embroidery image at which the workpiece tends to contract due to a tension caused by the embroidery stitches formed.

While the present invention has been described in detail in its presently preferred embodiment by reference to the accompanying drawings, it is to be understood that the invention is not limited to the details of the illustrated embodiment, but may be otherwise embodied.

In the illustrated embodiment of FIGS. 1–9, the principle of the invention is applied to the original embroidery image consisting of three image patterns (letters "T", "E" and "L") which are partially superimposed on each other or partially overlap each other. However, the invention is equally applicable to an original embroidery image consisting of two or more image patterns which are not partially superimposed on each other but are just adjacent to each other such that the normal image patterns (e.g., normal letters without removal of any portion thereof) have a common boundary or boundaries, or such that the normal image patterns partially bound each other.

Further, the principle of this invention is applicable to an original embroidery image consisting of two or more image patterns which are spaced apart from each other and have the normal outlines. In this case, the BLOCK ENLARGEMENT flag for a given major side of a given block of an image pattern is set to "ON" if a spacing distance between that major side to the opposed side of a block of the adjacent image pattern is smaller than a predetermined threshold.

In the illustrated embodiment, the BLOCK ENLARGEMENT flags are normally set at "OFF" and are set to "ON" if the affirmative decision (YES) is obtained in step S20 or S21. However, the BLOCK ENLARGEMENT flags for all the major sides of all blocks of each image pattern may be set to "ON", irrespective of whether those major sides of each image pattern at least partially overlap, at least partially lie on, or is at least partially adjacent to any side of any blocks of the other image pattern.

Figure 10:
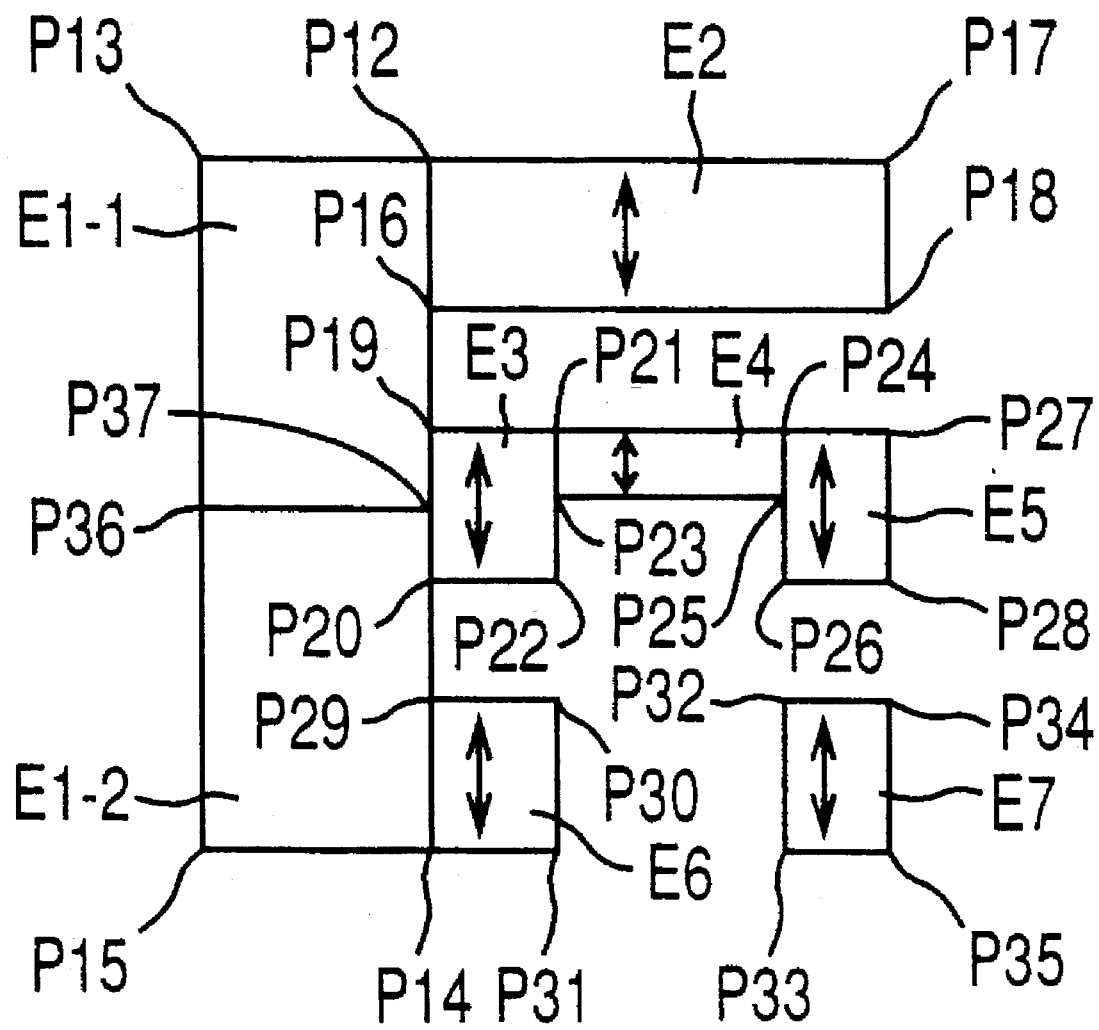
FIG. 10 is a view illustrating an another embodiment of the present invention.

In the illustrated embodiment of FIG. 4 wherein the first block E1 of the letter "E" is only partially bounded by the adjacent third block T3 of the letter "T", step S4 is adapted to move the entire length of the second major side P13–P15 of the block E1 toward the block T3. However, the routine of FIG. 4 may be modified so that only the portion of the major side P13–P15 of the block E1 which overlaps the first major side P9–P10 of the block T3 is moved toward the block T3. In this case, step S3 is modified to further divide the block E1 into sub-blocks E1–1 and E1–2, as indicated in FIG. 10. The sub-block E1–1 is defined by points P12, P13, P37 and P36, while the sub-block E1–2 is defined by points P37, P36, P14 and P15. The second major side P13–P36 of the sub-block E1–1 entirely overlaps the major side P9–P10 of the block T1, while the second major side P36–P15 of the sub-block E1–2 does not overlap the major side P9–P10 of the block T1. According to this arrangement, only the second major side P13–P36 of the first sub-block E1–1 is moved toward the block T1.

The illustrated embodiment of FIG. 9 is adapted to move not only the major sides of blocks of one image pattern which overlap any major side of any block of the adjacent image pattern, but also the major sides of that one image pattern which overlap any secondary side of the adjacent image pattern. However, the application of the present invention may be limited to the mutually overlapping major sides of the adjacent blocks of the adjacent image patterns. In this case, at least one of the mutually overlapping major sides of the adjacent image patterns is moved. This modification is possible by modifying steps S20 and S21 of the sub-routine of FIG. 9, so that step S20 is formulated to determine whether the first major side of the currently set first object block (B1, M1) at least partially overlaps or lies on any major side of the currently set second object block (B2, M2), while step S21 is formulated to determine whether the second major side of the currently set first object block (B1, M1) at least partially overlap or lies on any major side of the currently set second object block (B2, M2).

The sub-routine of FIG. 9 is adapted to be executed twice, firstly with the letters "T", "E" and "L" being numbers "1", "2" and "3", and secondly with these letters being reversely numbered "3", "2" and "1", whereby the mutually overlapping major sides (major side P9–P10 and major side P13–P15) of the adjacent blocks of the adjacent image patterns are both moved. However, the sub-routine of FIG. 9 may be modified so that only one of the mutually overlapping major sides of the adjacent blocks of the adjacent image patterns is moved. To this end, steps S20 and S21 are modified as indicated above, and the thus modified sub-routine of FIG. 9 is executed only once with the letters "T", "E" and "L" being numbered "1", "2" and "3", respectively.

Figure 11:
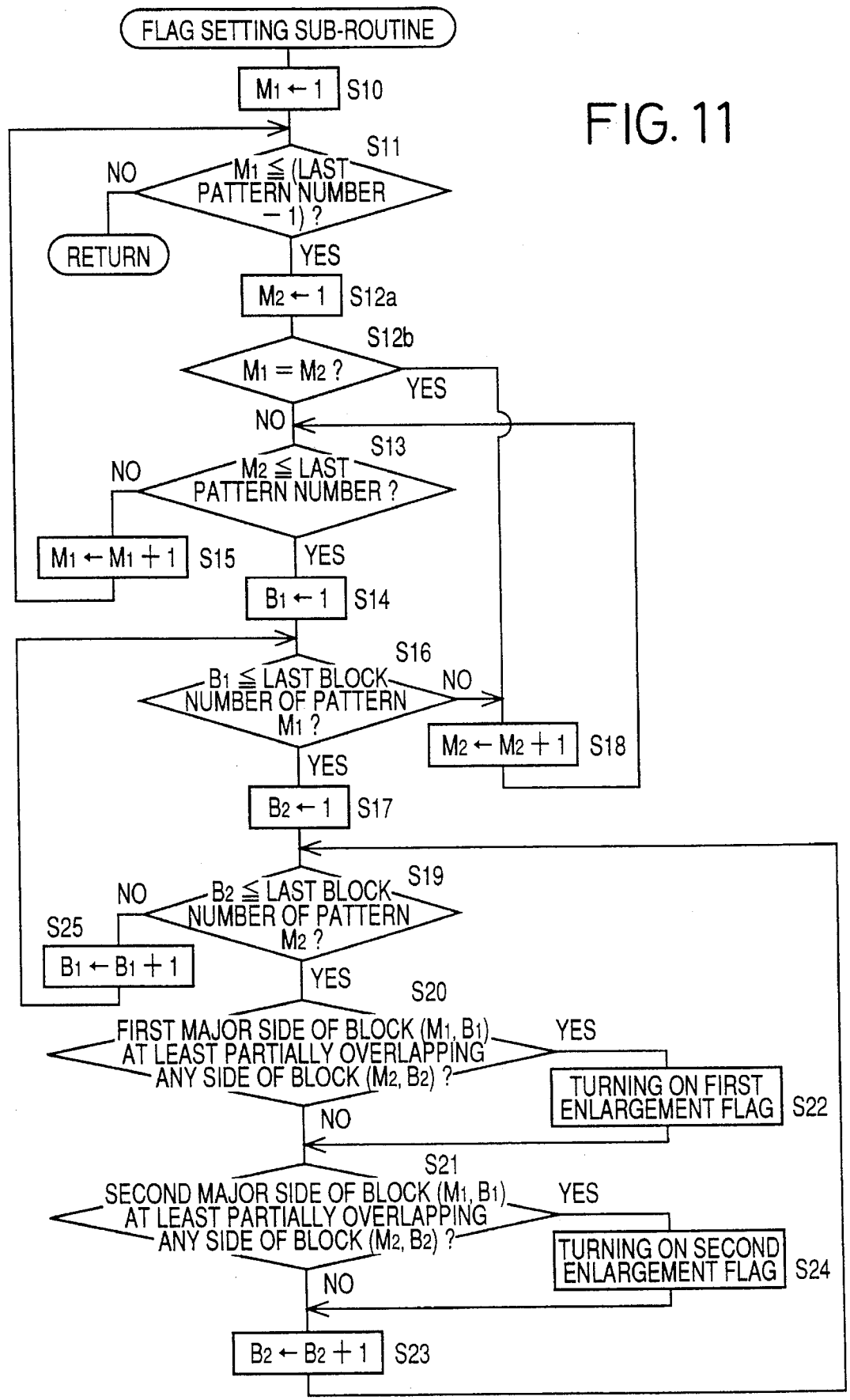
FIG. 11 is a flow chart illustrating a flag setting routine according to a further embodiment of this invention.

Further, the sub-routine of FIG. 9 may be modified as indicated in FIG. 11 so as to replace step S12 with steps S12a and S12b and such that the control flow goes to step S13 if a negative decision (NO) is obtained in step S12b, and to step S18 if an affirmative decision (YES) is obtained in step S12b. Only one execution of this modified sub-routine of FIG. 11 results in the same function as the sub-routine of FIG. 9.

In the illustrated embodiments of FIGS. 1–11, the outlines of the image patterns "T", "E" and "L" are manually specified in step S2 by operations of the mouse 13 while the original image is displayed on the display screen 7a on the basis of the original embroidery image data obtained in step S1 by the image scanner 12. However, the outlines of the image patterns may be almost automatically generated or defined by the microcomputer (2–6) on the basis of the original image data. As described above, the individual image patterns to be read by the image reader 12 have respective different brightness values. The original embroidery image data obtained by the image reader 12 consist of brightness data indicative of local brightness values (in 256 steps) of the image patterns which correspond to the picture elements of the image reading matrix of the image scanner 12. For automatic definition of the outlines of the original image patterns by the microcomputer, the operator positions the cursor on the display screen 7a within each of the displayed image patterns, and the microcomputer calculates an average of the brightness values at two or more picture elements which are suitably selected by the microcomputer depending upon the position of the cursor moved by the mouse 13 by the operator. Then, the microcomputer determines the upper and lower threshold values of the brightness for each of the different original image patterns, on the basis of the average brightness value calculated for each original image pattern. The microcomputer then determines the outline of each original image pattern on the basis of the brightness data indicative of the local brightness values of the image pattern in 256 steps, as compared with the determined upper and lower threshold values.

In the above modification wherein the outlines of the original image patterns are determined by the microcomputer on the basis of the brightness data obtained by the image reader 12, the outlines of the adjacent image patterns as defined by the microcomputer may differ from the actual outlines. For example, the outlines of the adjacent image patterns may be spaced apart from each other, although the adjacent image patterns have a common boundary or boundaries or are mutually bounded by or just adjacent to each other. However, this spacing between the adjacent image patterns whose outlines are automatically defined would not create a gap between the actually formed image patterns, if the embroidery data processing apparatus is adapted to change each outline of an image pattern which is adjacent to the outline of another image pattern. For example, the apparatus may be arranged to first determine whether a spacing between two segments of the outlines of two adjacent image patterns which are spaced from each other in the stitching direction is smaller than a predetermined threshold, and then move the segment of one of the two adjacent image patterns so that the moved segment is located within the other of the two adjacent image patterns. Both of the spaced-apart segments of the two adjacent image patterns may be moved so as to enlarge both of these image patterns as defined by the microcomputer. Further, both of two major segments of a given image pattern which is spaced from the adjacent image pattern in the stitching direction may be moved in the opposite directions parallel to the stitching direction, so as to enlarge that given image pattern.

The above arrangement to move the appropriate segment of segments of at least one of the adjacent image patterns so as to enlarge the appropriate image pattern or patterns is also effective where the outlines of the original embroidery image are defined on the basis of the original embroidery image data which are obtained by reading separate or mutually spaced-apart original image patterns, rather than reading mutually partially superimposed or mutually bounding image patterns having different brightness values as in the illustrated embodiments of FIGS. 1–11. In this case, the outline of each image pattern is defined by points specified by the operator as described above while each image pattern is displayed on the display screen 7a, and the thus defined outlines of the individual image patterns are positioned relative to each other using the mouse 13. However, the manipulation by the operator may cause a positioning error of the image patterns. For example, the two segments of the respective two adjacent image patterns that should lie on each other may be spaced apart from each other according to the outlines of the image patterns as manually positioned by the operator on the display screen 7a. This potential drawback may also be overcome according to the arrangement of the invention indicated above.

It is to be further understood that the present invention may be embodied with various other changes, modifications and improvements, which may occur to those skilled in the art, without departing from the spirit and scope of the invention defined in the following claims.

What is claimed is:

1. An apparatus for processing embroidery data including stitch-position data representative of stitch positions defining an embroidery to be formed on a workpiece by a sewing machine, the apparatus comprising:

image reading means for reading an original embroidery image corresponding to said embroidery to be formed on the workpiece, and generating original embroidery image data representative of said original embroidery image, said original embroidery image including a plurality of image patterns having respective outlines, said image reading means reading said plurality of image patterns such that said image patterns are distinguished from each other;

outline generating means for generating said outlines of said plurality of image patterns of said original embroidery image an the basis of said original embroidery data;

determining means for determining whether the outline of each one of said image patterns should be changed so as to enlarge, in at least one direction, an area which is partially defined by said outline of said each one of said image patterns;

outline changing means for changing said outline of said each one of said image patterns, said determining means determines that said outline of said each one of said image patterns should be moved; and stitch-position data generating means for generating stitch-position data representative of stitch positions defining said embroidery to be formed within the outlines of said image patterns which include said outline changed by said outline changing means.

2. An apparatus according to claim 1, wherein said determining means determines that the outline of each one of said image patterns should be changed if said outline which should be changed is adjacent to the outline of another of said image patterns.

3. An apparatus according to claim 1, wherein the outline of each of said image patterns includes two major segments which are spaced apart from each other in a spacing direction substantially parallel to a stitching direction in which a needle of said sewing machine and said workpiece are reciprocated relative to each other according to said stitch-position data, and wherein said determining means determines whether at least one of said two segments should be moved in said spacing direction.

4. An apparatus according to claim 1, further comprising direction determining means for determining a stitching direction in which a needle of said sewing machine and said workpiece are reciprocated relative to each other according to said stitch-position data, wherein said determining means determines whether said outline of said each one of said image patterns of said original embroidery image should be changed in at least one direction parallel to said stitching direction.

5. An apparatus according to claim 1, wherein said outline of each of said image patterns includes two major segments which are spaced apart from each other in a direction substantially parallel to a stitching direction in which a needle of said sewing machine and said workpiece are reciprocated relative to each other according to said stitch-position data, and wherein said determining means includes proximity determining means for at least determining whether each of said two major segments of the outline of said each one of said image patterns is adjacent to the outline of another of said image patterns, and said outline changing means includes segment moving means for changing at least one of said two major segments which is determined by said proximity determining means to be adjacent to the outline of said another image pattern, by moving said at least one of said two major segments into said outline of said another image patterns.

6. An apparatus according to claim 5, wherein said segment moving means of said outline changing means moves both of said two major segments if said proximity determining means determines that one of said two major segments is adjacent to the outline of said another image pattern, such that said one of said two major segments is moved in one direction into the outline of said another image pattern while the other of said two major segments is moved in a direction opposite to said one direction.

7. An apparatus according to claim 1, wherein said determining means determines that the outline of said one image pattern is adjacent to the outline of said another image pattern if a distance between a segment of the outline of said one image pattern and a segment of the outline of said another image pattern is smaller than a predetermined first threshold, and if an amount of overlap of said one image pattern and said another image pattern is smaller than a predetermined second threshold.

8. An apparatus according to claim 7, wherein said outline changing means moves said segment of the outline of said one image pattern into the outline of said another image pattern, and moves said segment of the outline of said another image pattern into the outline of said one image pattern, if said determining means determines that the outline of said one image pattern is adjacent to the outline of said another image pattern.

9. An apparatus according to claim 1, further comprising display means for displaying the outlines of said plurality of image patterns generated by said outline generating means, and operator-controlled input means for permitting an operator of the apparatus to specify at least one of said plurality of image patterns which the operator desires to enlarge, said outline changing means moving the outline of each of the image patterns which are specified by the operator through said operator-controlled input means.

10. An apparatus for processing embroidery data relating to a plurality of embroidery image patterns to be formed on a workpiece by a sewing machine, each of said embroidery image patterns having an outline consisting of a plurality of segments, said apparatus comprising;

a first embroidery data memory for storing original image pattern data representative of said plurality of embroidery image patterns;

blocking means for dividing each of said embroidery image patterns into a plurality of blocks, on the basis of outlines of said embroidery image patterns, the outline of each of said blocks having a plurality of segments;

pattern data changing means for changing said original image pattern data into modified image pattern data which cause a movement of each of at least one segment of the outline of at least one of said blocks of at least one of two adjacent ones of said plurality of embroidery image patterns, which at least one segment is adjacent to at least one segment of the other of said two adjacent embroidery image patterns, said movement occurring in a direction toward the other of said two adjacent embroidery image patterns; and a second embroidery data memory for storing said modified image pattern data.

11. An apparatus according to claim 10, wherein said pattern data changing means comprises:

determining means for determining whether each of the segments of the outline of each one of said two adjacent embroidery image patterns is adjacent to said at least one segment of the other of said two adjacent embroidery image patterns; and segment data changing means for changing original segment data of said original image pattern data into modified segment data representative of each segment of the outline of at least one of said two adjacent embroidery image patterns, if said each segment is adjacent to said at least one segment of said other embroidery image pattern, so that the modified segment data cause a movement of said each segment in said direction toward said other embroidery image pattern.

12. An apparatus according to claim 11, wherein said pattern data changing means further comprises change command memory means for storing change command data indicative of the changing of said original segment data into said modified segment data, said change command data being stored in said change command memory means, in relation to said original segment data for which an affirmative decision is obtained by said determining means, and wherein said segment data changing means changes said original segment data into said modified segment data on the basis of said change command data stored in said change command data memory means.

13. An apparatus according to claim 10, further comprising means for storing in said first embroidery data memory said modified image pattern data obtained by said pattern data changing means, whereby said said first embroidery data memory serves also as said second embroidery data memory.

14. An apparatus according to claim 10, further comprising:

image reading means for reading said plurality of embroidery image patterns and generating said original image pattern data; and outline generating means for generating the outlines of said embroidery image patterns on the basis of said original image pattern data.

15. An apparatus according to claim 14, wherein said outline generating means comprises:

a display for displaying said plurality of embroidery image patterns represented by said original image pattern data; and an operator-controlled data input device for specifying the outlines of said embroidery image patterns, on the basis of the embroidery image patterns displayed on said display.

16. An apparatus according to claim 14, said blocking means divides each of said embroidery image patterns into a plurality of rectangular blocks, on the basis of the outlines generated by said outline generating means.

17. An apparatus according to claim 10, further comprising embroidery data generating means for generating the embroidery data for forming stitches within the outline of said plurality of embroidery image patterns, on the basis of said modified image pattern data stored in said second embroidery data memory.

18. An apparatus according to claim 17, wherein said embroidery data generating means includes stitch-position data generating means for generating said stitch-position data which represent positions at which a needle of said sewing machine penetrates said workpiece to form stitches for defining said plurality of embroidery image patterns.

19. An apparatus according to claim 17, further comprising application means for utilizing said embroidery data.

20. An apparatus according to claim 19, wherein said application means comprises means for storing said embroidery data in a data storage medium removably installed on the apparatus.

21. An apparatus according to claim 19, wherein said application means comprises stitch forming means for forming stitches on said workpiece, according to said embroidery data.

22. An apparatus according to claim 10, wherein said pattern data changing means changes said original image pattern data into said modified image pattern data so that the mutually overlapping segments of the mutually bounding outlines of said two adjacent embroidery image patterns are both moved such that one of said mutually overlapping segments which partially defines one of said two adjacent embroidery image patterns is moved into the other of said two adjacent embroidery image patterns while the other of said mutually overlapping segments which partially defines the other of said two adjacent embroidery image patterns is moved into said one of said two adjacent embroidery image patterns.

23. An apparatus according to claim 10, wherein each of said embroidery image patterns consists of at least one quadrilateral block each of which has two major sides and two secondary sides connecting said major sides, said each block being embroidered by stitching in a direction substantially parallel to a direction in which said two major sides are opposed to each other, said original image pattern data for each of said embroidery image patterns comprising at least one set of original block data each representative of said each block, and wherein said pattern data changing means comprises block data changing means for changing at least one of the original block data sets representative of two blocks of respective two adjacent ones of said plurality of embroidery image patterns, at least if at least one of said two major sides of one of said two blocks is at least partially adjacent to at least one of said two major sides of the other of said two blocks, so that said at least one of the original block data sets changed by said block data changing means causes a movement of at least a portion of said at least one of said two major sides of said one of said two blocks toward the other of said two blocks, which portion is adjacent to said at least one of said two major sides of said other of said two blocks.

24. An apparatus according to claim 23, further comprising means for dividing one of said blocks of one of said two adjacent embroidery image patterns into two quadrilateral sub-blocks, if a first major side of said two major sides of said block to be divided into said two sub-blocks is only partially adjacent to a second major side of said two main sides of one of said blocks of the other of said two adjacent embroidery image patterns, one of said two sub-blocks having a major side which consists of a portion of said first major side which is adjacent to said second major side, while the other of said two sub-blocks having a major side which consists of the other portion of said first major side which is not adjacent to said second major side.

25. An apparatus according to claim 23, wherein said block data changing means changes said at least one of the original block data sets so that a distance of movement of said portion of each of said at least one of said two major sides of said one of said two blocks toward the other of said two blocks is constant.

26. An apparatus according to claim 23, wherein said block data changing means changes said at least one of the original block data sets so that a distance of movement of said portion of each of said at least one of said two major sides of said one of said two blocks toward the other of said two block changes as a function of a distance between said two major sides.

27. An apparatus for processing embroidery data including stitch-position data representative of stitch positions defining an embroidery to be formed on a workpiece by a sewing machine, said apparatus comprising:

image reading means for reading an original embroidery image corresponding to said embroidery to be formed on the workpiece, and generating original embroidery image data representative of said original embroidery image, said original embroidery image consisting of a combination of a plurality of letters which are arranged such that the adjacent letters are partially superimposed on each other, said image reading means reading said plurality of letters such that said letters are distinguished from each other;

outline generating means for generating outlines of said letters on the basis of said original embroidery image data;

determining means for determining whether the outline of each one of said letters should be changed so as to enlarge, in at least one direction, an area which is partially defined by said outline of said each one of said letters;

outline changing means for changing said outline of said each one of said image patterns, if said determining means determines that said outline of said each one of said letters should be moved; and stitch-position data generating means for generating stitch-position data representative of stitch positions defining said embroidery to be formed within the outlines of said combination of letters which include said outline changed by said outline changing means.

28. An apparatus for processing embroidery data relating to a combination of a plurality of letters to be formed on a workpiece by a sewing machine, said plurality of letters being arranged such that the adjacent letters are partially superimposed on each other, each of said plurality of letters having an outline consisting of a plurality of segments, said apparatus comprising:

a first embroidery data memory for storing original image pattern data representative of said plurality of letters;

pattern data changing means for changing said original image pattern data into modified image pattern data which cause a movement of each of at least one segment of the outline of at least one of two adjacent ones of said plurality of letters, which at least one segment is adjacent to at least one segment of the other of said two adjacent letters, said movement occurring in a direction toward the other of said two adjacent letters; and a second embroidery data memory for storing said modified image pattern data.

* * * * *